United States Patent
Li et al.

(10) Patent No.: US 11,602,872 B2
(45) Date of Patent: Mar. 14, 2023

(54) TRANSPARENT WOOD AND A METHOD FOR ITS PREPARATION

(71) Applicant: Cellutech AB, Stockholm (SE)

(72) Inventors: Yuanyuan Li, Taby (SE); Ramiro Rojas, Hagersten (SE); Lars Berglund, Akersberga (SE)

(73) Assignee: Cellutech AB, Stockholm (SE)

( * ) Notice: Subject to any disclaimer, the term of this patent is extended or adjusted under 35 U.S.C. 154(b) by 662 days.

(21) Appl. No.: 16/498,515

(22) PCT Filed: Mar. 29, 2018

(86) PCT No.: PCT/SE2018/050344
§ 371 (c)(1),
(2) Date: Sep. 27, 2019

(87) PCT Pub. No.: WO2018/182497
PCT Pub. Date: Oct. 4, 2018

(65) Prior Publication Data
US 2020/0023546 A1    Jan. 23, 2020

(30) Foreign Application Priority Data
Mar. 29, 2017   (SE) .................. 1750376-4

(51) Int. Cl.
*B27K 3/00* (2006.01)
*B27K 3/02* (2006.01)
*B27K 5/02* (2006.01)
*B27K 3/15* (2006.01)
*C08L 25/06* (2006.01)
(Continued)

(52) U.S. Cl.
CPC .............. *B27K 3/15* (2013.01); *B27K 3/0207* (2013.01); *B27K 3/0292* (2013.01); *B27K 5/02* (2013.01); *C08L 25/06* (2013.01); *C08L 33/12* (2013.01); *C08L 97/02* (2013.01); *C08L 2201/10* (2013.01)

(58) Field of Classification Search
CPC .......... B27K 3/15; B27K 3/0207; B27K 5/02
See application file for complete search history.

(56) References Cited

U.S. PATENT DOCUMENTS 492,308 A    2/1893  Pool
4,913,972 A *  4/1990  Grunewalder ......... C08L 97/02
427/325

(Continued)

FOREIGN PATENT DOCUMENTS

CN    1350091    5/2002
CN    1422731    6/2003

(Continued)

OTHER PUBLICATIONS

Fink .Transparent Wood—A New Approach in the Functional Study of Wood Structure. Holzforschung—International Journal of Biology, Chemistry, Physics and Technology of Wood. 1992, 46(5); 403-408 (Year: 1992).*

(Continued)

*Primary Examiner* — Cachet I Proctor
(74) *Attorney, Agent, or Firm* — Fish & Richardson P.C.

(57) ABSTRACT

A transparent wood comprising at least one polymer and a wood substrate comprising more than 15% lignin, measured as Klason lignin, and having an optical transmittance of at least 60%, as well as a method for its preparation.

15 Claims, 4 Drawing Sheets

(51) Int. Cl.
*C08L 33/12* (2006.01)
*C08L 97/02* (2006.01)

(56) References Cited

U.S. PATENT DOCUMENTS

| | | | |
|---|---|---|---|
| 5,242,464 A | 9/1993 | Armstrong et al. | |
| 5,503,996 A | 4/1996 | Torget et al. | |
| 2008/0023162 A1* | 1/2008 | Myllymaki | C08H 8/00 162/163 |
| 2011/0114273 A1* | 5/2011 | Yaqoob | D21C 3/222 162/23 |
| 2012/0283363 A1* | 11/2012 | Kumamoto | C08L 97/02 524/35 |

FOREIGN PATENT DOCUMENTS

| | | |
|---|---|---|
| CN | 106182289 | 12/2016 |
| CN | 106243391 | 12/2016 |
| CN | 106313221 | 10/2017 |
| JP | S 5738103 | 3/1987 |
| JP | H 05111904 | 5/1993 |
| JP | 2012046848 | 3/2012 |
| RU | 2278883 | 6/2006 |
| RU | 2432368 | 10/2011 |
| WO | WO 2017/098149 | 6/2017 |
| WO | WO 2017/136714 | 8/2017 |
| WO | WO 2018/182497 | 10/2018 |

OTHER PUBLICATIONS

Li et al. Optically Transparent Wood from a nanoporous cellulosic template: combining functional and structural performance. Biomacromolecules. 2016 17(4) pp. 1358-1364 (Year: 2016).*

Yaddanapudi et al. Fabrication and characterization of transparent wood for next generation smart building applications. Vacuum, 2017, 146:649-654 (Year: 2017).*

Zhu et al. "Highly Anisotropic, Highly Transparent Wood Composites". Advanced Materials, 2016, 26:5181-5187 (Year: 2016).*

Burgert et al., "Bio-inspired functional wood-based materials—hybrids and replicates," International Materials Reviews, 2015, 60:431-450.

Carter, "The Chemistry of Paper Preservation: Part 2. The Yellowing of Paper and Conservation Bleaching," Journal of chemical education, 1996, 73(11):1068.

Fink, "Transparent wood—a new approach in the functional study of wood structure," Holzforschung—International Journal of the Biology, Chemistry, Physics and Technology of Wood, 1992, 46(5):403-408.

International Search Report and Written Opinion in Appln. No. PCT/SE2018/050344, dated May 21, 2018, 13 pages.

Keplinger et al., "A versatile strategy for grafting polymers to wood cell walls," Acta biomaterialia, 2015, 11:256-263.

Li et al., "Lignin-retaining transparent wood," ChemSusChem, 2017, 10:3445-3451.

Li et al., "Optically Transparent Wood from a Nanoporous Cellulosic Template: Combining Functional and Structural Performance," Biomacromolecules, 2016, 17(4):1358-1364.

Li et al., "Wood-polymer composites prepared by the in situ polymerization of monomers within wood," Journal of Applied Polymer Science, 2011, 119:3207-3216.

Muller et al., "Yellowing and IR-changes of spruce wood as result of UV-irradiation," Journal of Photochemistry and Photobiology B: Biology, 2003, 69(2):97-105.

Perez et al., "Biodegradation and biological treatments of cellulose, hemicellulose and lignin: an overview," International Microbiology, 2002, 5(2):53-63.

Yaddanapudi et al., "Fabrication and characterization of transparent wood for next generation smart building applications," Vacuum, 2017, 146:649-654.

Zhu et al., "Highly Anisotropic, Highly Transparent Wood Composites," Advanced Materials, 2016, 26:5181-5187.

International Preliminary Report on Patentability in International Appln. No. PCT/SE2018/050344, dated Oct. 10, 2019, 10 pages.

Li et al., "Wood composite as an energy efficient building material: guided sunlight transmittance and effective thermal insulation," Advanced Energy Materials, Nov. 2016, 6(22):1601122, 8 pages.

Luce, "Delignified Impregnated Wood," Meeh, Eng., Oct. 1944, 66:654-655.

Novaes et al., "Lignin and biomass: a negative correlation for wood formation and lignin content in trees," Plant physiology, Oct. 2010, 154(2):555-561.

Ramos et al., "Bleaching with hydrogen peroxide," A review, Afinidad, 2008, 65(537):366-373.

Zhu et al., "Transparent and haze wood composites for highly efficient broadband light management in solar cells," Nano Energy, Aug. 1, 2016, 26: 31 pages.

* cited by examiner

TRANSPARENT WOOD AND A METHOD FOR ITS PREPARATION

CROSS-REFERENCE TO RELATED APPLICATIONS

This application is a National Stage application under 35 U.S.C. § 371 of International Application No. PCT/SE2018/050344, filed Mar. 29, 2018, which claims priority to SE1750376-4, filed Mar. 29, 2017. The disclosures of the prior applications are incorporated by reference in their entirety.

FIELD OF THE INVENTION

The present invention relates to transparent wood having an optical transmittance of at least 60%, wherein the transparent wood comprises at least one polymer and a wood substrate comprising more than 15% lignin, measured as Klason lignin, as well as a method for the preparation of such transparent wood.

TECHNICAL BACKGROUND

Wood is by far the most important structural material from renewable resources, and it is to a large extent used in construction for load-bearing applications (J. Dinwoodie, ISBN 0-419-23580-92000). The properties such as its high strength-to-weight ratio, unique porous structure, wide abundance, renewability, environmentally benign nature, and relative ease of working are some of the advantages with wood as a material. (Li, et al., Journal of Applied Polymer Science, 119 (2011) 3207-3216) The oriented cellulose microfibrils in the wood cell wall is an important reason for the mechanical and structural function whereas the chemical composition and hierarchical structure offers vast possibilities for functionalization and modification. (R. E. Mark, Cell wall mechanics of tracheids, JSTOR1967; Burgert et al. in International Materials Reviews, 60 (2015) 431-450) Modification of wood is a mean to preserve the many positive attributes of wood while eliminating some of the negative effects such as cracks and fungal attacks caused by moisture, creating a stronger, more durable and lasting material while also customizing for specific needs. (C.A.S. Hill ISBN: 0-470-02172-1) In a recent review by Burgert et al. in International Materials Reviews, 60 (2015) 431-450, the potential of wood as a substrate for functional materials is discussed. By being able to specifically functionalize wood at the level of cell and cell walls one can insert new properties and inevitably upscale them along the intrinsic hierarchical structure, to a level of large-scale engineering materials applications. (Keplinger, et al., Acta biomaterialia, 11 (2015) 256-263)

One limitation for wood application in, e.g., solar energy harvesting or other light-transmitting applications, such as in windows, light diffusers, and display screens, is that wood is non-transparent. One of the reasons why wood is not naturally transparent is due to light scattering at the interface between the cell wall tissue and the porous lumen space at the centre of fibrous tracheids and vessel cells with diameters in the order of tens of micrometres. In addition, lignin, tannins and other resinous compounds absorb light through chromophoric groups. (Perez et al., International Microbiology, 5 (2002) 53-63; and Fink, Holzforschung-International Journal of the Biology, Chemistry, Physics and Technology of Wood, 46 (1992) 403-408). Müller et al., Journal of Photochemistry and Photobiology B: Biology, 69 (2003) 97-105, presented that lignin accounts for 80-95% of the light absorption in wood.

Transparent wood can open a novel set of possible applications were the mechanical performance, high strength to weight ratio and toughness may be combined with good optical transmittance. Transparent wood has been prepared for wood morphology studies and to show that transparent wood combines functional (optical transparency) properties with structural properties (mechanical) and has potential in light-transmitting building applications. The previous approach for preparation of transparent wood was based on delignification of the substrate followed by impregnation with a polymer with matched refractive index to the wood substrate. Fink (Holzforschung-International Journal of the Biology, Chemistry, Physics and Technology of Wood, 46 (1992)) treated wood with a 5% aqueous solution of sodium hypochlorite for 1-2 days to remove coloured substances, including lignin. Li, et al. (Biomacromolecules, 17 (2016) 1358-1364) reported delignification by sodium chlorite. The lignin content was strongly decreased from around 25% to less than 3%. Mingwei Zhu et al. (Advanced Materials, 26 (2016) 5181-5187) removed the lignin by cooking in NaOH and $Na_2SO_3$ solution followed by hydrogen peroxide ($H_2O_2$) treatment. However, delignification processes are time consuming and not necessarily environmentally friendly.

SUMMARY OF THE INVENTION

The objective of this invention is to provide transparent wood with a high transmittance, and optionally a high haze, prepared in a green and industrially scalable method without the need for delignification. Also provided is a method for preparing transparent wood wherein a piece of wood is bleached without delignification, followed by impregnation of the bleached wood substrate with a polymer to obtain a transparent wood.

Accordingly, the present invention relates to transparent wood comprising a wood substrate and at least one polymer, wherein the transparent wood has an optical transmittance of at least 60% at a wavelength in the electromagnetic spectrum of wavelengths from 400 to 1000 nm, and wherein the wood substrate comprises more than 15% lignin, measured as Klason lignin. The invention further relates to a method for the preparation of such transparent wood.

BRIEF DESCRIPTION OF THE DRAWINGS

FIG. 1a) shows a graph over brightness of bleached wood vs time for treatment with $H_2O_2$ compared with delignification b-d) show SEM-images of cell wall structures of original wood (b), $H_2O_2$ treated wood (c), and delignified wood (d).

FIG. 3 a) Optical transmittance of TW-$H_2O_2$ transparent wood substrates, inset is photograph of transparent wood; b) Optical haze of TW-$H_2O_2$, inset is picture of TW-$H_2O_2$ with a 5 mm gap between sample and underlying paper.

DETAILED DESCRIPTION OF THE INVENTION

All words and abbreviations used in the present application shall be construed as having the meaning usually given to them in the relevant art, unless otherwise indicated. For clarity, some terms are however specifically defined below. It should be noted that an embodiment, feature or advantage described in the context of one of the aspects or embodiments of the present invention may also apply mutatis mutandis to all the other aspects and embodiments of the invention.

In a first aspect, the present invention relates to transparent wood comprising a wood substrate and at least one polymer, wherein the transparent wood has an optical transmittance of at least 60% at a wavelength in the electromagnetic spectrum of wavelengths from 400 to 1000 nm, and wherein the wood substrate comprises at least 15% lignin, measured as Klason lignin.

Figure 6:
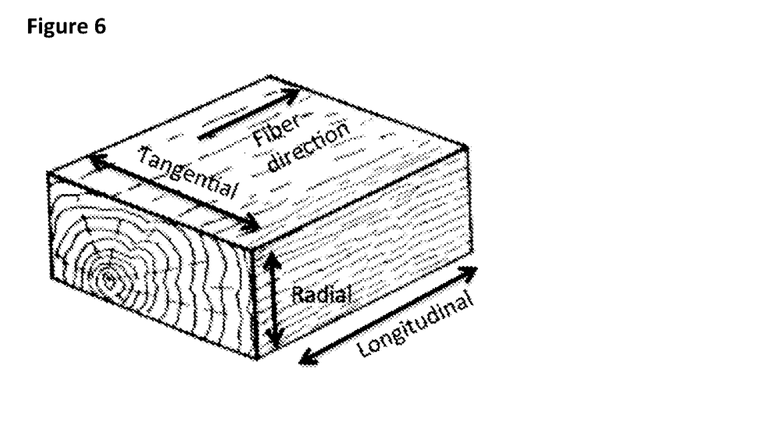
FIG. 6 illustrates the tangential, radial and longitudinal directions of wood.

The thickness of the transparent wood may be measured in the radial, tangential or the longitudinal direction of a wood substrate used for preparation of transparent wood (see FIG. 6). The longitudinal direction is measured substantially in parallel with the direction of the wood fibres, while the tangential and radial directions are measured substantially perpendicular to the fibres. The term thickness of the transparent wood disclosed herein refers to the distance between two surfaces of a piece of transparent wood and through which distance light is transmitted. In general, the incident light is perpendicular to the surface of the piece of transparent wood through which it is transmitted. However, light incident on the surface at other angles than perpendicular to the surface may also be transmitted.

The transparent wood according to the present invention may have a thickness of at least 0.3 mm, or at least 0.5 mm, or at least 1 mm. In principle, the upper limit for the thickness of the transparent wood would be the available thickness of the wood substrate used for the preparation of the transparent wood. Suitably, the thickness of the transparent wood may be up to and including 10 mm, up to and including 8 mm, up to and including 5 mm, up to and including 3 mm. Light propagates easier through the wood when transmitted mainly in parallel with the wood fibres. The present invention provides a transparent wood with a good transparency transverse the wood fibres.

Throughout the present description, the term transparency denotes the physical property of allowing the transmission of light through a material. Total transmittance is used herein to characterize the transparency. The transmittance as used herein is measured in a setup involving an integrating sphere. A very high brightness light source is used whose spectrum spans from UV to near-IR wavelengths (170 nm-2100 nm) (EQ-99 from Energetiq Technology Inc). An incident beam from the light source is directed into the integrating sphere through an input port. Light is directed out from another port of the sphere through an optical fibre and recorded by a spectrometer as the WHITE (W) spectrum of the incident beam. DARK (D) spectrum is then recorded by turning off the light source. A sample is then put just in front of the sphere's input port, and a SIGNAL (S) spectrum is measured. The transmittance through the sample at a specific wavelength, which includes both specular and diffuse transmittance, is calculated as (S-D)/(W-D) at that specific wavelength.

The transparent wood according to the present invention may have an optical transmittance of at least 60%, or at least 70%, at a wavelength in the range 400-1000 nm, in at least one direction of the wood. The transparent wood of the present invention may have an optical transmittance in at least one direction of the wood of at least 60%, or at least 70% in one or more of the wavelength intervals selected from the group of intervals consisting of 400-409 nm, 410-419 nm, 420-429 nm, 430-439 nm, 440-449 nm, 450-459 nm, 460-469 nm, 470-479 nm, 480-489 nm, 490-499 nm, 500-509 nm, 510-519 nm, 520-529 nm, 530-539 nm, 540-549 nm, 550-559 nm, 560-569 nm, 570-579 nm, 580-589 nm, 590-599 nm, 600-609 nm, 610-619 nm, 620-629 nm, 630-639 nm, 640-649 nm, 650-659 nm, 660-669 nm, 670-679 nm, 680-689 nm, 690-699 nm, 700-709 nm, 710-719 nm, 720-729 nm, 730-739 nm, 740-749 nm, 750-759 nm, 760-769 nm, 770-779 nm, 780-789 nm, 790-799 nm, 800-809 nm, 810-819 nm, 820-829 nm, 830-839 nm, 840-849 nm, 850-859 nm, 860-869 nm, 870-879 nm, 880-889 nm, 890-899 nm, 900-909 nm, 910-919 nm, 920-929 nm, 930-939 nm, 940-949 nm, 950-959 nm, 960-969 nm, 970-979 nm, 980-989 nm, 990-1000 nm. The transparent wood of the present invention may have an optical transmittance in at least one direction of the wood of at least 60%, or at least 70% over the whole range 500-600 nm, or over the whole range 500-700 nm, or over the whole range 400-700 nm, or over the whole range 400-1000 nm. Further, the transparent wood according to the present invention may have an optical transmittance in at least one direction of the wood of at least 80%, at least at a single wavelength in the range 550-700 nm; or in one or more of the wavelength intervals selected from the group of intervals consisting of 550-559 nm, 560-569 nm, 570-579 nm, 580-589 nm, 590-599 nm, 600-609 nm, 610-619 nm, 620-629 nm, 630-639 nm, 640-649 nm, 650-659 nm, 660-669 nm, 670-679 nm, 680-689 nm, 690-699 nm, 700-709 nm, 710-719 nm, 720-729 nm, 730-739 nm, 740-749 nm, 750-759 nm, 760-769 nm, 770-779 nm, 780-789 nm, 790-799 nm, 800-809 nm, 810-819 nm, 820-829 nm, 830-839 nm, 840-849 nm, 850-859 nm, 860-869 nm, 870-879 nm, 880-889 nm, 890-899 nm, 900-909 nm, 910-919 nm, 920-929 nm, 930-939 nm, 940-949 nm, 950-959 nm, 960-969 nm, 970-979 nm, 980-989 nm, 990-1000 nm; or over the whole range 550-700 nm. The aforementioned transmittances may be obtained on pieces of wood having a thickness of at least 0.3 mm, at least 0.5 mm, at least 1.0 mm, at least 1.5 mm, at least 2 mm, at least 2.5 mm, or at least 3.0 mm. In general, the transparent wood according to the present invention may have the thickness measured in the radial, or tangential direction (see FIG. 6).

The transparent wood may further have an optical haze in at least one direction of the wood of at least 60%, or at least 70%, or at least 75%, or at least 80%, at a wavelength in the range 400-1000 nm; or in one or more of the wavelength intervals selected from the group of intervals consisting of 400-409 nm, 410-419 nm, 420-429 nm, 430-439 nm, 440-449 nm, 450-459 nm, 460-469 nm, 470-479 nm, 480-489 nm, 490-499 nm, 500-509 nm, 510-519 nm, 520-529 nm, 530-539 nm, 540-549 nm, 550-559 nm, 560-569 nm, 570-579 nm, 580-589 nm, 590-599 nm, 600-609 nm, 610-619 nm, 620-629 nm, 630-639 nm, 640-649 nm, 650-659 nm, 660-669 nm, 670-679 nm, 680-689 nm, and 690-699 nm, 700-709 nm, 710-719 nm, 720-729 nm, 730-739 nm, 740-749 nm, 750-759 nm, 760-769 nm, 770-779 nm, 780-789 nm, 790-799 nm, 800-809 nm, 810-819 nm, 820-829 nm, 830-839 nm, 840-849 nm, 850-859 nm, 860-869 nm, 870-879 nm, 880-889 nm, 890-899 nm, 900-909 nm, 910-919 nm, 920-929 nm, 930-939 nm, 940-949 nm, 950-959 nm, 960-969 nm, 970-979 nm, 980-989 nm, 990-1000 nm; or over the whole range 500-600 nm, or the whole range 400-700 nm, or the whole range 400-1000 nm. Haze is measured according to the "Standard Method for Haze and Luminous Transmittance of Transparent Plastics" (ASTM D1003). High haze is favourable in materials used in buildings, where such materials provide for entry of light while at the same time allowing for privacy. Also, haze make the incident light spread into large areas, which provides for a uniform light distribution.

Lignin content in wood is measured as Klason lignin and determined according to TAPPI method TAPPI T 222 om-02. A high content of Klason lignin, as in the transparent wood of the present invention, imparts rigidity to the cell walls and acts as a binder between wood cells, creating a composite material that is outstandingly resistant to compression, impact, and bending, making it useful in load-bearing applications. The transparent wood according to the present invention comprises a wood substrate comprising more than 15% lignin, or more than 20%, measured as Klason lignin.

The transparent wood according to the present invention comprises at least one polymer. The volume fraction of polymer in the transparent wood may be 70-95%. The polymer volume fraction for transparent balsa wood is typically 91-95%, for transparent birch wood around 70-75%. The term volume fraction is used as common for fibre composite materials, i.e. the volume of a constituent in percent of the total volume of the final material. Suitable polymers may have a refractive index from 1.3 to 1.7, or from 1.4 to 1.6, or from 1.45 to 1.55. Suitable polymers may have aromatic properties. The polymers suitable for the transparent wood according to the present invention may be selected from, but not limited to, the group of materials including thermoplastic polymers, and thermosetting polymers, such as any one of poly(hexafluoropropylene oxide), hydroxypropyl cellulose, poly(tetrafluoroethylene-co-hexafluoropropylene), poly(pentadecafluorooctyl acrylate), poly(tetrafluoro-3-(heptafluoropropoxy)propyl acrylate), poly(tetrafluoro-3-(pentafluoroethoxy)propyl acrylate), poly(tetrafluoroethylene), poly(undecafluorohexyl acrylate), poly(nonafluoropentyl acrylate), poly(tetrafluoro-3-(trifluoromethoxy)propyl acrylate), poly(pentafluorovinyl propionate), poly(heptafluorobutyl acrylate), poly(trifluorovinyl acetate), poly(octafluoropentyl acrylate), poly(methyl 3,3,3-trifluoropropyl siloxane), poly(pentafluoropropyl acrylate), poly(2-heptafluorobutoxy)ethyl acrylate), poly(chlorotrifluoroethylene), poly(2,2,3,4,4-hexafluorobutyl acrylate), poly(methyl hydro siloxane), poly(methacrylic acid), poly(dimethyl siloxane), poly(trifluoroethyl acrylate), poly(2-(1,1,2,2-tetrafluoroethoxy)ethyl acrylate, poly(trifluoroisopropyl methacrylate), poly(2,2,2-trifluoro-1-methylethyl methacrylate), poly(2-trifluoroethoxyethyl acrylate), poly(vinylidene fluoride), poly(trifluoroethyl methacrylate), poly(methyl octadecyl siloxane), poly(methyl hexyl siloxane), poly(methyl octyl siloxane), poly(isobutyl methacrylate), poly(vinyl isobutyl ether), poly(methyl hexadecyl siloxane), poly(ethylene oxide), poly(vinyl ethyl ether), poly(methyl tetradecyl siloxane), poly(ethylene glycol mono-methyl ether), poly(vinyl n-butyl ether), poly(propylene oxide), poly(3-butoxypropylene oxide), poly(3-hexoxypropylene oxide), poly(ethylene glycol), poly(vinyl n-pentyl ether), poly(vinyl n-hexyl ether), poly(4-fluoro-2-trifluoromethyl- styrene), poly(vinyl octyl ether), poly(vinyl n-octyl acrylate), poly(vinyl 2-ethylhexyl ether), poly(vinyl n-decyl ether), poly(2-methoxyethyl acrylate), poly(acryloxypropyl methyl siloxane), poly(4-methyl-1-pentene), poly(3-methoxypropylene oxide), poly(t-butyl methacrylate), poly(vinyl n-dodecyl ether), poly(3-ethoxypropyl acrylate), poly(vinyl propionate), poly(vinyl acetate), poly(vinyl methyl ether), poly(ethyl acrylate), poly(vinyl methyl ether) (isotactic), poly(3-methoxypropyl acrylate), poly(1-octadecene), poly(2-ethoxyethyl acrylate), poly(isopropyl acrylate), poly(1-decene) (atactic), poly(propylene), poly(lauryl methacrylate), poly(vinyl sec-butyl ether) (isotactic), poly(n-butyl acrylate), poly(dodecyl methacrylate), poly(ethylene succinate), poly(tetradecyl methacrylate), poly(hexadecyl methacrylate), poly(vinyl formate), ethylene/vinyl acetate copolymer-40% vinyl acetate, poly(2-fluoroethyl methacrylate), poly(octyl methyl silane), poly(methyl acrylate), poly(dicyanopropyl siloxane), poly(oxymethylene), poly(sec-butyl methacrylate), poly(dimethylsiloxane-co-alpha-methyl styrene), poly(n-hexyl methacrylate), Ethylene/vinyl acetate copolymer-33% vinyl acetate, poly(n-butyl methacrylate), poly(ethylidene dimethacrylate), poly(2-ethoxyethyl methacrylate), poly(n-propyl methacrylate), poly(ethylene maleate), Ethylene/vinyl acetate copolymer-28% vinyl acetate, poly(ethyl methacrylate), poly(vinyl butyral), poly(vinyl butyral)-11% hydroxyl, poly(3,3,5-trimethylcyclohexyl methacrylate), poly(2-nitro-2-methylpropyl methacrylate), poly(dimethylsiloxane-co-diphenylsiloxane), poly(1,1-diethyl propyl methacrylate), poly(triethylcarbinyl methacrylate), poly(methyl methacrylate), poly(2-decyl-1,4-butadiene), polypropylene (isotactic), poly(vinyl butyral)-19% hydroxyl, poly(mercaptopropyl methyl siloxane), poly(ethyl glycolate methacrylate), poly(3-methylcyclohexyl methacrylate), poly(cyclohexyl alpha-ethoxyacrylate), poly(4-methylcyclohexyl methacrylate), poly(decamethylene glycol dimethacrylate), poly(vinyl alcohol), poly(vinyl formal), poly(2-bromo-4-trifluoromethyl styrene), poly(1,2-butadiene), poly(sec-butyl alpha-chloroacrylate), poly(2-heptyl-1,4-butadiene), poly(vinyl methyl ketone), poly(ethyl alpha-chloroacrylate), poly(vinyl formal), poly(2-isopropyl-1,4-butadiene), poly(2-methylcyclohexyl methacrylate), poly(bornyl methacrylate), poly(2-t-butyl-1,4-butadiene), poly(ethylene glycol dimethacrylate), poly(cyclohexyl methacrylate), poly(cyclohexanediol-1,4-dimethacrylate), unvulcanized butyl rubber, gutta percha b poly(tetrahydrofurfuryl methacrylate), poly(isobutylene), low density polyethylene, Ethylene/methacrylic acid ionomer, polyethylene, polyethylene lonomer, polyacetal, poly(1-methylcyclohexyl methacrylate), poly(2-hydroxyethyl methacrylate), poly(1-butene) (isotactic), poly(vinyl methacrylate), poly(vinyl chloroacetate), poly(N-butyl methacrylamide), gutta percha a, poly(2-chloroethyl methacrylate), poly(methyl alpha-chloroacrylate), poly(2-diethylaminoethyl methacrylate), poly(2-chlorocyclohexyl methacrylate), poly(acrylonitrile), cis-poly(isoprene), poly(allyl methacrylate), poly(methacrylonitrile), poly(methyl isopropenyl ketone), poly(butadiene-co-acrylonitrile), poly(2-ethyl-2-oxazoline), poly(1,4-butadiene), poly(N-2-methoxyethyl)methacrylamide, poly(2,3-dimethylbutadiene) [methyl rubber], poly(2-chloro-1-(chloromethyl)ethyl methacrylate), poly(1,3-dichloropropyl methacrylate), poly(acrylic acid), poly(N-vinyl pyrrolidone), nylon 6 [Poly(caprolactam)], poly(butadiene-co-styrene) (30% styrene) block copolymer, poly(cyclohexyl alpha-chloroacrylate), poly(methyl phenyl siloxane), poly(2-chloroethyl alpha-chloroacrylate), poly(butadiene-co-styrene) (75/25), poly(2-aminoethyl methacrylate), poly(furfuryl methacrylate), poly(vinyl chloride), poly (butylmercaptyl methacrylate), poly(1-phenyl-n-amyl methacrylate), poly(N-methyl methacrylamide), high density polyethylene, poly(cyclohexyl alpha-bromoacrylate), poly(sec-butyl alpha-bromoacrylate), poly(2-bromoethyl methacrylate), poly(dihydroabietic acid), poly(abietic acid), poly(ethylmercaptyl methacrylate), poly(N-allyl methacrylamide), poly(1-phenylethyl methacrylate), poly(2-vinyltetrahydrofuran), poly(vinylfuran), poly(methyl m-chlorophenylethyl siloxane), poly(p-methoxybenzyl methacrylate), poly(isopropyl methacrylate), poly(p-isopropyl styrene), chlorinated poly(isoprene), poly(p,p'-xylylenyl dimethacrylate), poly(cyclohexyl methyl silane), poly(1-phenylallyl methacrylate), poly(p-cyclohexylphenyl methacrylate), poly(chloroprene), poly(2-phenylethyl methacrylate), poly(m-ethyl m-chlorophenyl siloxane), poly[4,4-heptane bis(4-phenyl)carbonate)], poly[1-(o-chlorophenyl)ethyl methacrylate)], Styrene/maleic anhydride copolymer, poly(1-phenylcyclohexyl methacrylate), Nylon 6,10 [Poly(hexamethylene sebacamide)], Nylon 6,6 [Poly(hexamethylene adipamide)], nylon 6(3)T [Poly(trimethyl hexamethylene terephthalamide)], poly(2,2,2'-trimethylhexamethylene terephthalamide), poly(methyl alpha-bromoacrylate), poly(benzyl methacrylate), poly[2-(phenylsulfonyl)ethyl methacrylate], poly(m-cresyl methacrylate), styrene/acrylonitrile copolymer, poly(o-methoxyphenol methacrylate), poly(phenyl methacrylate), poly(o-cresyl methacrylate), poly(diallyl phthalate), poly(2,3-dibromopropyl methacrylate), poly(2,6-dimethyl-p-phenylene oxide), poly(ethylene terephthalate), poly(vinyl benozoate), poly[2,2-propane bis[4-(2-methylphenyl)]carbonate], poly[1,1-butane bis(4-phenyl)carbonate], poly(1,2-diphenylethyl methacrylate), poly(o-chlorobenzyl methacrylate), poly(m-nitrobenzyl methacrylate), poly(oxycarbonyloxy-1,4-phenyleneisopropylidene-1,4-phenylene), poly[N-(2-phenylethyl)methacrylamide], poly[1,1-cyclohexane bis[4-(2,6-dichlorophenyl)]carbonate], polycarbonate resin, Bisphenol-A polycarbonate, poly(4-methoxy-2-methylstyrene), poly(o-methyl styrene), polystyrene, poly[2,2-propane bis[4-(2-chlorophenyl)]carbonate], poly[1,1-cyclohexane bis(4-phenyl)carbonate], poly(o-methoxy styrene), poly(diphenylmethyl methacrylate), poly[1,1-ethane bis(4-phenyl)carbonate], poly(propylene sulfide), poly(p-bromophenyl methacrylate), poly(n-benzyl methacrylamide), poly(p-methoxy styrene), poly(4-methoxystyrene), poly[1,1-cyclopentane bis(4-phenyl)carbonate], poly(vinylidene chloride), poly(o-chlorodiphenylmethyl methacrylate), poly[2,2-propane bis[4-(2,6-dichlorophenyl)]carbonate], poly(pentachlorophenyl methacrylate), poly(2-chlorostyrene), poly(alpha-methylstyrene), poly(phenyl alpha-bromoacrylate), poly[2,2-propane bis[4-(2,6-dibromophenyl)cabonate], poly(p-divinylbenzene), poly(n-vinyl phthalimide), poly(2,6-dichlorostyrene), poly(chloro-p-xylene), poly(beta-naphthyl methacrylate), poly(alpha-naphthyl carbinyl methacrylate), poly(phenyl methyl silane), poly(sulfone) [poly[4,4'-isopropylidene diphenoxy di(4-phenylene)sulfone]], polysulfone resin, poly(2-vinylthiophene), poly (2,6-diphenyl-1,4-phenylene oxide), poly(alpha-naphthyl methacrylate), poly(p-phenylene ether-sulphone), poly[diphenylmethane bis(4-phenyl)carbonate], poly(vinyl phenyl sulfide), poly(styrene sulfide), butylphenol formaldehyde resin, poly(p-xylylene), poly(2-vinylnaphthalene), poly(n-vinyl carbazole), naphthalene-formaldehyde rubber, phenol-formaldehyde resin, or co-polymers or mixtures thereof having a refractive index from 1.3 to 1.7; from 1.4 to 1.6; or from 1.45 to 1.55. Preferred polymers are selected from poly(methyl methacrylate) (PMMA), epoxy, poly(glycidyl methacrylate) (PGMA), polydimethylsiloxane (PDMS) and polystyrene (PS), or co-polymers or mixtures thereof having a refractive index from 1.4 to 1.6; or from 1.45 to 1.55. Preferably the polymer is PMMA, or co-polymers or mixtures thereof having a refractive index from 1.4 to 1.6; or from 1.45 to 1.55. The polymer affects the mechanical strength of the final transparent wood and may provide strength to the transparent wood.

In a second aspect, the present invention relates to a method for preparing a transparent wood according to the present invention, comprising the steps of
 a) Providing at least one piece of wood substrate;
 b) Adding a bleaching liquor to inactivate the chromophores in the wood substrate, thereby obtaining a bleached wood substrate comprising at least 15% lignin;
 c) Impregnating the bleached wood substrate obtained in (b) with a solution comprising pre-polymers, or monomers, or a combination thereof,
 d) Polymerizing the impregnating pre-polymers, or monomers, or combination thereof, to obtain a transparent wood comprising a wood substrate and at least one polymer.

Suitable bleaching liquors for use in the present method are lignin-retaining bleaching liquors that may provide a bleached wood substrate, such as having at least 70% brightness, and comprising at least 15% lignin. Lignin-retaining bleaching liquors are commonly known. Examples of bleaching liquors for use in the method according to the present invention comprises an agent selected from a peroxide system, including peroxides, percarbonates, and perborates, or a salt thereof. Suitable peroxide systems for use in step (b) comprises at least one system selected from the group consisting of hydrogen peroxide, sodium percarbonate, sodium perborate, peracetic acid, and sodium peroxide. Preferred peroxide systems for use in step (b) comprises at least a hydrogen peroxide or a salt thereof. More preferably the bleaching agent used in step (b) comprises hydrogen peroxide, such as 3-40 wt % hydrogen peroxide as calculated on the total weight of the bleaching liquor.

The wood substrate provided in step (a) may be selected from angiosperms, such as balsa, birch, ash, and oak; and gymnosperms, such as conifers (including spruce and pine), cycads, and ginkgo. The wood substrate is preferably selected from angiosperms, and especially from balsa and birch; more preferably balsa (specifically *Ochroma pyramidale*). Balsa has the advantage of being a lightweight material, with a typical density of about 160 kg/m$^3$, and a large specific strength. The wood substrate provided in step (a) may be in the form of veneer, sawn or carved out pieces or planks, or compressed wood chips, preferably veneer, having a thickness of at least 0.3 mm, or at least 0.5 mm, or at least 1.0 mm, or at least 1.5 mm, or at least 3 mm. In principle, there is no limitation in the dimensions of the wood substrate, however preparation of large substrates will take longer time. Suitably, the thickness of the wood substrate may be up to and including 10 mm, or up to and including 5 mm.

Metal ions may degrade hydrogen peroxide used for bleaching and discolour the wood. The method according to the present invention may therefore further comprise a step of removing metal ions from wood substrate. One way of removing metal ions is by adding DTPA (diethylenetriaminepentaacetic acid) to the wood substrate, for example at 50° C. and allowed to react for 1 hour, before adding the substrate to the bleaching liquor in step (b). The wood substrate may also be impregnated with water before bleaching. Water impregnation will speed up the diffusion of the bleaching agents into the wood and thus accelerates the bleaching step.

In the present method, the wood is bleached by a chlorine free reagent. The bleaching liquor used in step (b) in the method described herein oxidizes the chromophores in the wood, such as chromophores in the lignin, which bleaches the wood. The bleaching capacity of the active bleaching agents may depend on the pH. Preferably, the wood is bleached by hydrogen peroxide under alkaline conditions. The bleaching liquor used in step (b) may further comprise one or more stabilizers and chelating agents. More specifically, the bleaching liquor may comprise deionized water (DI), hydrogen peroxide, sodium silicate, sodium hydroxide, magnesium sulphate, and DTPA. A specific composition of the bleaching liquor used in step (b) may comprise DI, hydrogen peroxide (e.g. 4 wt %), sodium silicate (e.g. 3 wt %), sodium hydroxide (e.g. 3 wt %), magnesium sulphate (e.g. 0.1 wt %), and DTPA (e.g. 0.1 wt %). The bleaching liquor in step (b) may comprise 4-30 wt % sodium peroxide, or 4-10 wt % sodium peroxide. The given amounts of the individual components in the bleaching liquor are based on the total weight of the water in said liquor. Further, the bleaching liquor used in step (b) may be used at a temperature above room temperature, such as at 70° C. The bleaching liquor used in the method according to the present invention causes inactivation of the chromophores, which enables a bleached wood where the lignin, although with inactivated chromophores, is retained and the main wood structure is preserved, allowing for the maintenance of most of the strength of the wood.

Bleaching the wood may change the wood colour from its characteristic brownish to bright white. A high brightness provides for a colourless wood with a high transmittance. In the method according to the present invention, the bleaching of the wood in step (b) may be performed until the wood has a brightness of at least 70%, or a brightness of at least 80%. For a fully bleached wood, it might be possible to obtain 90% brightness when combining different bleaching processes. Transparent wood prepared from wood with brightness less than 70% may appear to be yellowish. When wood is bleached to near white, there is not much light absorption in the wood. Transparent colourless wood may be obtained after impregnation by polymer matching the RI of the components of bleached wood. The brightness is measured according to ISO brightness 2470-1:2009. The time for bleaching depends on the bleaching liquor and the form and type of wood. For example, the time for bleaching may be longer for thicker pieces or for other tree types such as pine, compared to the bleaching time for pieces of thin balsa.

The method according to the present invention may further comprise a step of solvent exchange after having obtained a bleached wood in step (b).

Throughout the present application, the term "monomer" is used for a chemical compound that can undergo polymerization. The term "pre-polymer" is used herein for a partially polymerized chemical intermediate that can be fully polymerized at a later stage. The pre-polymer, or monomer, or a combination thereof, impregnating the bleached wood in step (c), fills the pores of the wood substrate. The impregnation may be pressure assisted or vacuum assisted, preferably vacuum assisted. Suitable pre-polymers, or monomers, or a combination thereof, for use in step (c) are those that may polymerize and form a polymer with a refractive index (RI) that is near the refractive index of the main components of bleached wood, for example methyl methacrylate, ethyl methacrylate, styrene, isoprene, methyl acrylate, vinyl acetate, acrylonitrile, dimethoxy dimethyl silane, acrylic acid, ethylene oxide, propylene oxide, dodecyl methacrylate, bornyl methacrylate, propylene, ethylene, isobutylene, allyl methacrylate, isopropyl methacrylate, ethylene glycol, vinyl n-decyl ether, 2-methoxyethyl acrylate, vinyl propionate, vinyl methyl ether, ethyl acrylate, and pre-polymers thereof. A preferred monomer is methyl methacrylate and also preferred are pre-polymers thereof. Polymers with a refractive index (RI) that is near the refractive index of the main components of bleached wood may be selected from any one of those mentioned herein as being suitable for the transparent wood according to the present invention. Another preferred monomer is styrene. Styrene has the advantage of easily impregnating the wood.

The polymerization in step (d) may be made by being subjecting the impregnated bleached wood to an elevated temperature, such as a temperature above room temperature; or by addition of a chemical compound; or by UV. Preferably, the polymerization in step (d) is made by subjecting the impregnated bleached wood to an elevated temperature, for example to at least 50° C., or to at least 70° C.; for a period of time suitable for the polymer to cure. The method suitable for curing may be selected based on the size of the impregnated wood substrate. Before polymerization the impregnated bleached wood may be sandwiched between two non-sticking plates, such as between slides of Teflon, glass or polypropylene, and optionally packaging the sandwich in an aluminium foil, to keep the impregnating pre-polymer or monomer in the wood substrate during the treatment. The polymerization enables the polymer to stay in the wood substrate, which has the effect that the transparent wood can be handled without falling apart. The polymer further provides for the transparency of the transparent wood.

Suitable polymers obtained by the polymerization in step (d) have a refractive index (RI) that is near the refractive index of the main components of bleached wood, in order to have the same or similar type of light propagation through the whole material. The refractive indices of typical components of bleached wood are about 1.61 for lignin; about 1.53 for hemicellulose; and about 1.54 for cellulose. The RI of bleached lignin should be about the same as for lignin according to equation (I) (Brauns, et al., The Chemistry of Lignin: Covering the Literature for the Years 1949-1958, Academic Press, 1960, pp. 197-198).

$$n - 1 = \frac{K}{\frac{m}{dA}} - 1 \tag{1}$$

Wherein K is a constant (5.07), m is the molecular weight, d is the density, A the total volume of the atoms or atom groups in the molecule, and n is the refractive index.

The refractive index of the polymer obtained from the polymerization in step (d) may be from 1.4 to 1.6; or from 1.45 to 1.55. An advantage with using a polymer with a refractive index that matches the wood substrate is that the haze may be lowered. The polymer obtained in step (d) may be selected from any one of those mentioned herein as being suitable for the transparent wood according to the present invention.

The optical transmittance of the transparent wood may be further improved by different means, such as matching as close as possible the RI of the components of the bleached wood and the impregnating polymer. The more thorough impregnation, the more the presence of empty volume is reduced, and the better transmittance; use of polymer and/or curing systems that have minimum shrinkage during curing and/or drying, which will prevent presence of empty volume in the wood substrate; or the use of two or more of these means in combination.

A detailed method for preparing a transparent wood substrate as provided herein may comprise the steps of providing at least one wood substrate; optionally adding a sequestrant, such as DTPA, to remove metal ions from the wood substrate; adding a bleaching liquor, for example a solution comprising water, hydrogen peroxide, sodium silicate, sodium hydroxide, magnesium sulphate, and DTPA, at an elevated temperature, such as 70° C., to bleach the wood substrate until approximately white; optionally performing a solvent exchange; optionally pre-polymerizing monomers to obtain a pre-polymer; impregnating the bleached wood with monomers or a pre-polymer, for example by using vacuum or freeze-pump thawing; and polymerizing the pre-polymer to cure the polymer, for example at an elevated temperature, by addition of a chemical compound, or by UV.

Also, the haze of the transparent wood prepared by the method according to the present invention may be further improved by different means, such as by matching as close as possible the RI of the components of the bleached wood and the impregnating polymer; use of polymer/curing systems that have minimum shrinkage during curing and/or drying, which will prevent presence of empty volume in the wood substrate; or a combination of at least two of these means.

Figure 2:
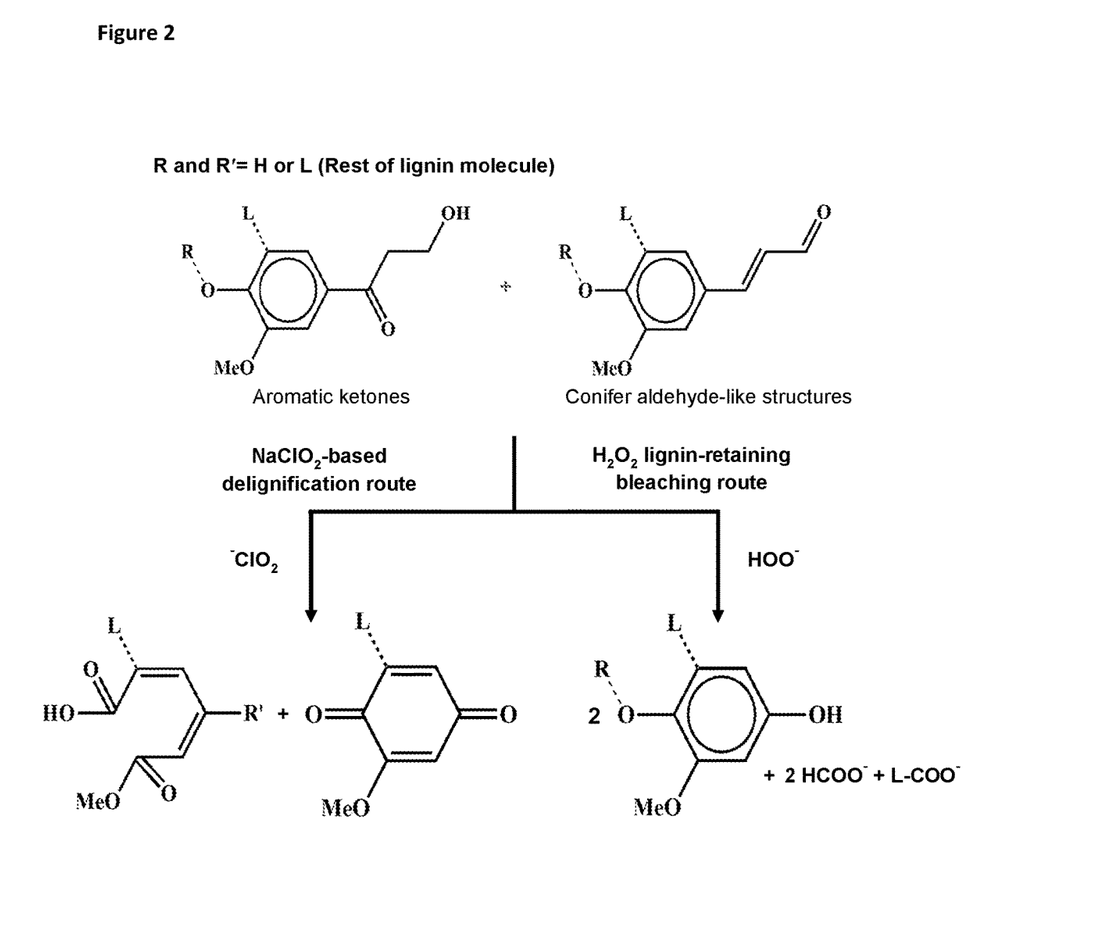
FIG. 2 Representative lignin structures that are the most important contributors to wood colour, as well as the main products of the two processes ($NaClO_2$- and $H_2O_2$-processes) (H. Carter, A., Journal of chemical education, 1996, 73, 1068, The Chemistry of Paper Preservation: Part 2, The Yellowing of Paper and Conservation Bleaching.
Figure 5:
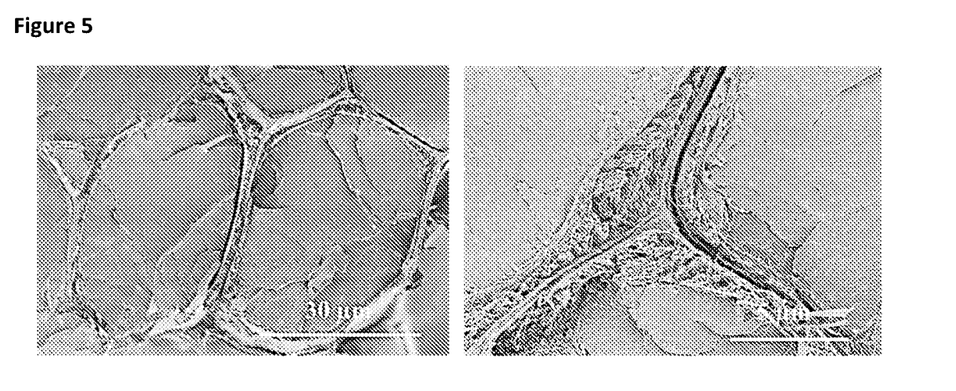
FIG. 5 presents SEM images of TW-H$_2$O$_2$, demonstrating the distribution of PMMA in wood lumen space.

The FE-SEM images in FIG. 5 show the structure of wood impregnated by PMMA. The lumen space is filled with PMMA. The method for preparation of transparent wood according to the present invention provides a time saving process and requires less mass transport compared to the use of a delignification step. An advantage with the present method according to the present invention is that the lignin in the wood substrate is not entirely removed. The bleaching step (b) according to the present invention, removes or selectively oxidizes the chromophoric structures, while most of the bulk lignin is preserved. The typical reactions are presented in FIG. 2.

An advantage with keeping the lignin structure in the material, as with the method of the present invention, is that less material needs to be removed from original/native wood substrate. Further, several different wood species can be used, such as pine and ash that usually become very fragile when they are delignified. A wood substrate having a preserved lignin network makes the substrate stronger and thus easier to handle without causing it to fall apart or break, compared to delignified wood substrates where the wood structure has been damaged. This is particularly significant for wet substrates and those with low thickness. The preserved lignin network may also make the substrate more compatible with specific classes of polymers, e.g., those with aromatic structures like polystyrene. Further, delignified substrates require a larger fraction of polymer to be impregnated into the porous structure to prevent scattering of light.

Further, the process for bleaching a wood substrate, as in step (b) herein, is significantly faster compared to a process for delignification of substrates. Both the number of chemicals and their amounts are significantly reduced and provides for a green process that is less toxic and environmental damaging. Especially $H_2O_2$ treatment under alkaline conditions is an attractive lignin-retaining method since it is environmentally friendly, industrially scalable and results in strong brightness/brightness stability effects in wood pulp.

The transparent wood according to the present invention may be used as a construction material in light transmitting buildings. Light transmitting buildings would enable reduction of the energy consumption through the possibility of partially replacing the artificial light in the buildings with natural light. Transparent wood has advantages compared with glass, such as its renewable resource origin; light weight, with a density of about 1200 $kg/m^3$; high optical transmittance; haze and no shattering. With the method according to the present invention the odorous materials normally formed during delignification are excluded, such as methyl mercaptan, dimethyl sulphide, and hydrogen sulphide, which are generated during Kraft pulping. Further the process is chlorine-free (TCF) and there is no formation of toxic effluents such as chlorinated dioxins.

The present invention also relates to transparent wood that is obtained by the method according to the present invention.

EXAMPLES

The transparent wood according to the present invention and comparative examples are illustrated in the following examples.

Example 1

Lignin-Retaining Bleaching

Pieces of balsa wood (*Ochroma pyramidale*, purchased from Wentzels Co. Ltd, Sweden), with dimension of 20 mm×20 mm and thickness of 1 mm (thickness in radial direction) and a density of 160 $kg/m^3$ were dried at 105±3° C. for 24 h. Bleaching liquor was prepared by mixing chemicals in the following order: deionized water, sodium silicate (3.0 wt %) (Fisher Scientific UK), sodium hydroxide solution (3.0 wt %) (Sigma-Aldrich), magnesium sulphate (0.1 wt %) (Scharlau), DTPA (0.1 wt %) (Acros Organics) and then $H_2O_2$ (4.0 wt %) (Sigma-Aldrich) wherein all weight percentages are in relation to the weight of water in bleaching liquor. Bleached wood substrates were obtained by immersing 10 pieces of balsa in 200 mL (excess amount) of the bleaching liquor at 70° C. until the wood became white, approximately 2 hrs. The bleached wood substrates were thoroughly washed with deionized water and kept in water until further use.

Example 2 (Comparative)

Sodium Chlorite Delignification

A substrate of balsa wood (*Ochroma pyramidale* purchased from Wentzels Co. Ltd., Sweden) with dimension of 20 mm×20 mm and thickness of 1.0 mm (thickness in radial direction) and a density of 160 $kg/m^3$ was dried at 105±3° C. for 24 h before chemical extraction. The dried substrate was delignified using 400-500 mL of 1 wt % of sodium chlorite ($NaClO_2$, Sigma-Aldrich) in acetate buffer solution (pH 4.6) at 80° C. (excess amount). The reaction was stopped when the wood became white, which took 6 hrs. The delignified substrate was carefully washed with deionized water and kept in water until further use.

Example 3

Transparent Wood Preparation

Before polymer impregnation, the wood substrates obtained in Examples 1 and 2 were dehydrated by solvent exchange with ethanol and acetone sequentially. Each solvent exchange step was repeated 3 times. Methyl methacrylate (MMA) monomer (Sigma-Aldrich) was first pre-polymerized at 75° C. for 15 min with 0.3 wt % (based on MMA monomer) 2,2'-azobis (2-methylpropionitrile) (AIBN) (Sigma-Aldrich) as initiator and cooled down to room temperature. Subsequently, the delignified or bleached wood substrates from Examples 1 and 2 were fully vacuum-impregnated for several hours in pre-polymerized PMMA solution. Finally, the impregnated wood substrates were sandwiched between two glass slides, packaged in aluminium foil, and then cured in an oven at 70° C. for 4 h. Reference samples of PMMA without wood substrate were prepared from the same MMA monomer.

Example 4

Large Wood Template

Figure 1:
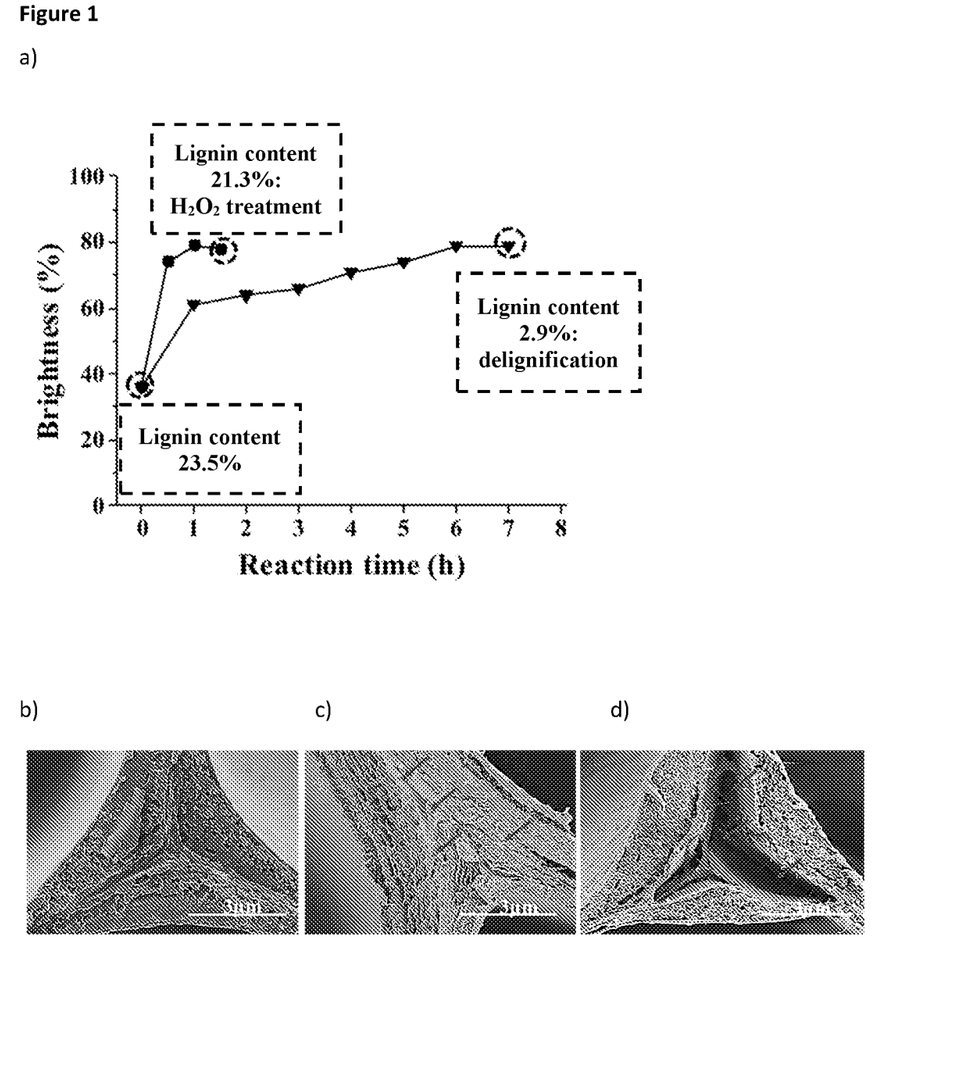

As a demonstrator for the potential to make large wood templates for transparent wood, a large substrate of balsa with dimensions 10 cm×10 cm×3 mm (thickness in radial direction) was prepared in accordance with Example 1, although one piece of 10 cm×10 cm and 3 mm thick (radial direction) was immersed in about 500 mL of the bleaching liquor, and bleaching until the wood became white took about in 5 hours. FE-SEM micrographs (FIG. 1 b-c) of the cell wall before and after $H_2O_2$ treatment did not show substantial micro-scale damage, not even in the lignin-rich middle lamella. Delamination of the cell wall occurred to very limited extent, in support of largely preserved lignin distribution in wood. As a reference, a corresponding wood sample prepared with the delignification process in accordance with Example 2 was prepared. It took approximately 24 hrs before the wood became white. Severe cell wall delamination occurred after delignification, see FIG. 1d. Arrows point to the lignin-rich middle lamella, almost empty in (e). As cell walls are delaminated and separated, the open space between them is much larger than the space originally occupied by the middle lamella. This occurs as the large lignin fraction in the middle lamella, between wood cells, is removed.

Example 5

Wood from Different Sources

Samples of wood from different sources were prepared with a lignin-retaining treatment according to Example 1 and delignification according to Example 2, respectively. The lignin content (measured as Klason lignin) in the original wood before bleaching or delignification was 37.3% for pine, 24.2% for birch, 23.5% for balsa, and 27.1% for ash. For the mechanical test, the samples were cut into dimension of 50×10×1.5 mm followed by chemical treatment as given in Table 1. The lignin content in the bleached or delignified wood substrate and the wet strength, as measured by a tensile strength test, are presented in Table 1.

TABLE 1

| Wood | Treatment methods | Time (h) | Weight loss (%) | Klason Lignin content (%) | Wet strength ‖ (MPa) | Wet strength⊥ (MPa) |
|---|---|---|---|---|---|---|
| Balsa | Lignin-retaining treatment | 2 | 12 | 21.3 | 7.9 ± 1.2 | 0.2 ± 0.09 |
|  | Delignification | 6 | 26.4 | 2.5 | 6.9 ± 1.3 | 0.2 ± 0.04 |
| Birch | Lignin-retaining treatment | 2 | 10.6 | 20.1 | 14.4 ± 3.3 | 0.8 ± 0.2 |
|  | Delignification | 12 | 25.3 | 3.3 | 1.4 ± 0.4 | 0.07 ± 0.03 |
| Pine | Lignin-retaining treatment | 8 | 25.0 | 22.3 | 14.4 ± 2.2 | 0.1 ± 0.02 |
|  | Delignification | 18 | 40.9 | 5.2 | # | # |
| Ash | Lignin-retaining treatment | 4 | 15.5 | 22.4 | 13.9 ± 1.4 | 0.2 ± 0.05 |
|  | Delignification | 18 | 31.1 | 5.3 | 0.8 ± 0.3 | # |

‖: in parallel with fibre,
⊥perpendicular to fibre direction
: the samples are too weak to keep the shape for the test.

Example 6

Different Wood Substrates and Polymers

Before polymer impregnation, the wood substrates obtained in Examples 1 were dehydrated by solvent exchange with ethanol and acetone sequentially. Each solvent exchange step was repeated 3 times. Chosen monomer from the table below is pre-polymerized at 75° C. with 0.3-0.5 wt % (based on monomer) 2,2'-azobis (2-methylpropionitrile) (AIBN) (Sigma-Aldrich) as initiator and cooled down to room temperature. The bleached wood substrates were fully vacuum-impregnated in the pre-polymer solution. Finally, the impregnated wood substrates were sandwiched between two glass slides, packaged in aluminum foil and then cured at 70° C. over night. Table 2 lists the different transparent wood formulations with the measured optical transmittance and haze perpendicular to the surface, i.e. in the radial direction of the wood.

TABLE 2

| Wood template | Thickness (mm) | Type | Refractive index | Pre-polymerization (min) | Optical transmittance (550 nm) | Haze (550 nm) |
|---|---|---|---|---|---|---|
| Balsa | 1.5 | Methyl methacrylate | 1.49 | 15-25 | 83% | 71% |
| Balsa | 1.5 | Styrene | 1.60 | 90 | 65% | 66% |
| Balsa | 1.5 | Glycidyl methacrylate | 1.38 | <5 | 85% | 68% |
| Ash | 1.5 | Methyl methacrylate | 1.49 | 15-25 | 64% | 80% |
| Pine | 1.5 | Methyl methacrylate | 1.49 | 15-25 | 72% | 79% |
| Birch | 1.5 | Methyl methacrylate | 1.49 | 15-25 | 66% | 79% |

Example 7

Elevated Pressure

Before polymer impregnation, a wood substrate obtained according to Example 1 was dehydrated by solvent exchange with ethanol and acetone sequentially. Each solvent exchange step was repeated 3 times. The bleached wood substrate was added to styrene containing 0.4 wt % (based on monomer) 2,2'-azobis (2-methylpropionitrile) (AIBN) (Sigma-Aldrich) and put in the reactor vessel under vacuum first and then pressurized at 5 bar until fully impregnated. The still pressurized vessel was put in oil bath at 90° C. over night for curing. The sample could not be measured for optical transmittance since the wood piece stuck in lump of polymer. The sample was visually transparent when compared to other pieces that had been measured for optical transmittance.

Example 8

Lignin-Retaining Bleaching with Sodium Perborate

Pieces of balsa wood (*Ochroma pyramidale*, purchased from Conrad Elektronik Norden AB, Sweden), with dimension of 20 mm×20 mm and thickness of 1.5 mm (thickness in radial direction) were washed and immersed in deionized water until completely wetted. A pre-treatment of the wetted wood pieces before bleaching was applied with deionized water with 0.5 wt % of diethylenetriamine pentaacetic acid (DTPA) at 50° C. for 1 h. A bleaching liquor was prepared by mixing chemicals in the following order: deionized water, sodium silicate (3.0 wt %) (Fisher Scientific UK), sodium hydroxide solution (3.0 wt %) (Sigma-Aldrich), magnesium sulphate (0.1 wt %) (AppliChem Panreac), DTPA (0.1 wt %) (Roth) and then sodium perborate (6.5 wt %) (Alfa Aesar), wherein all weight percentages are in relation to the weight of water in bleaching liquor. Bleached wood substrates were obtained by immersing 10 pieces of balsa in 200 mL (excess amount) of the bleaching liquor at 70° C. until the wood became white, approximately 2 hrs. The bleached wood substrates were thoroughly washed with deionized water and kept in water until further use.

Characterization

SEM

The cross-sections of wood samples were observed with a Field-Emission Scanning Electron Microscope (Hitachi S-4800, Japan) operating at an acceleration voltage of 1 kV. Freeze-drying was conducted on deionized water washed wood samples. The cross-section of the samples was prepared by fracturing the freeze-dried samples after cooling with liquid nitrogen.

Tensile Strength

Tensile strength tests were carried out with 10%/min strain rate and 25 mm of span by using an Instron 5944 with a 500 N load cell.

3-Point Bending

A 3-point bending test was performed using an Instron 5944 with a 500 N load cell. The samples were conditioned in room humidity of 50% for 2-3 days. The tests were carried out with 10%/min strain rate and 30 mm of span. All samples were cut into a strip (5 mm×60 mm) for testing.

Lignin Content

Lignin content (Klason lignin) in wood samples was determined according to TAPPI method TAPPI T 222 om-02.

Brightness

Wood brightness was tested according to ISO brightness 2470-1, 2009.

Transmittance

The transmittance was measured in a setup involving an integrating sphere. A light source with wavelengths from 170 to 2100 nm was applied (EQ-99 from Energetiq Technology, Inc.). An incident beam from the light source was directed into the integrating sphere through an input port. Light was directed out from another port of the sphere through an optical fibre and recorded by a spectrometer (AvaSpec-ULS3648, Avantes) as the WHITE (W) spectrum of the incident beam. DARK (D) spectrum was recorded by turning off the light source. For transmittance measurements, the sample was put just in front of the sphere's incident beam input port, the spectrum was then directed out of another port of the sphere through an optical fibre and recorded as a SIGNAL (S). The transmittance through the sample at a specific wavelength, which includes both specular and diffuse transmittance, was calculated as (S-D)/(W-D) at that specific wavelength. Haze measurement was recorded following the "Standard Method for Haze and Luminous Transmittance of Transparent Plastics" (ASTM D1003).

Results

Brightness and Lignin Content

Delignification was performed as described in Example 2. During delignification, the brightness increased slowly with treatment time. The brightness stabilized at around 80% after a 6 hr process, shown in FIG. 1a. The lignin content was decreased from about 23.5 wt % to 2.5 wt %. For the $H_2O_2$ treatment, as described in Example 1, the brightness increased sharply to 77% after only 0.5 h. After 1 h, the brightness reached 79%. Further increase in the processing time did not increase the brightness beyond 80%. The lignin content decreased only slightly, from 23.5% to 21.3%, and the microstructure was well preserved.

Optical Transmittance

Figure 3:
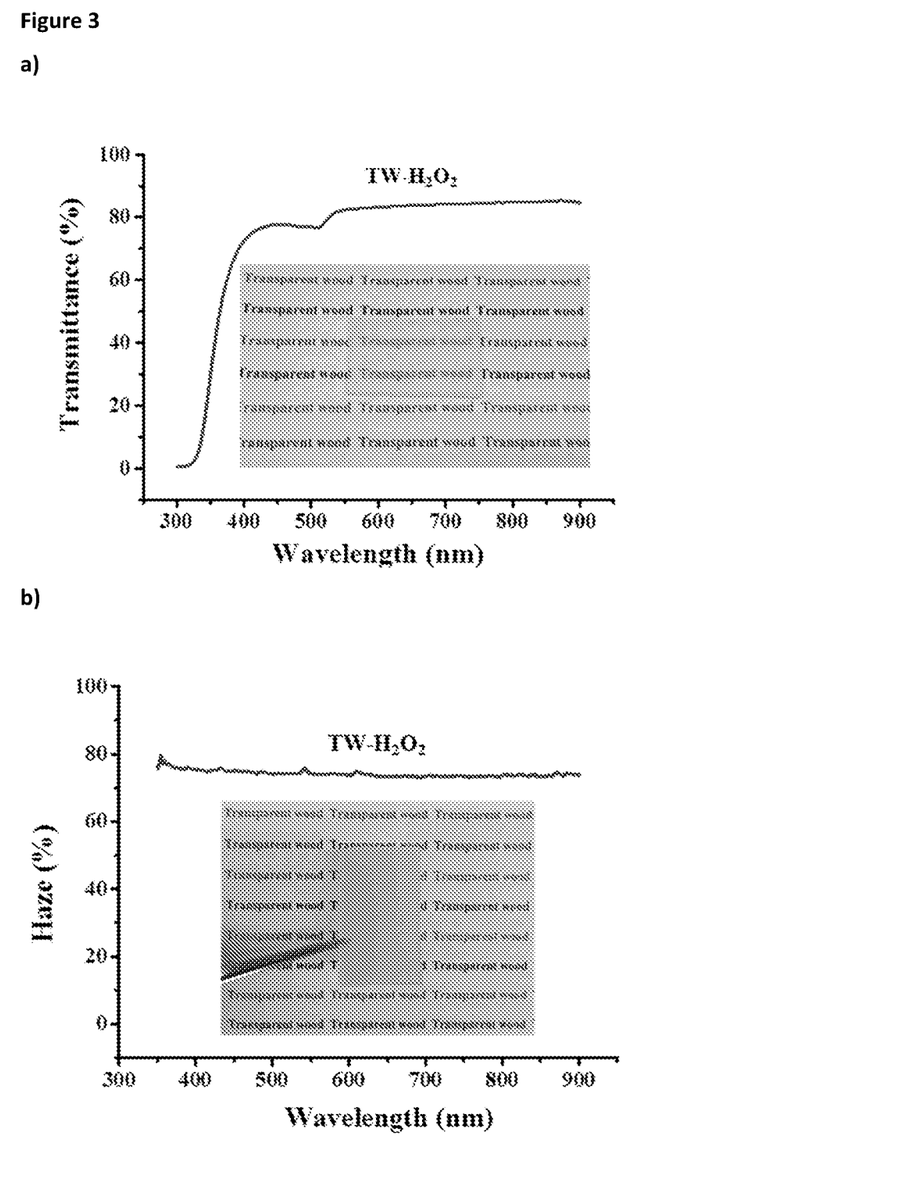

Transparent wood (TW-$H_2O_2$) prepared according to Example 3 demonstrated high optical transparency, shown in FIG. 3a. Optical transmittance and haze of TW-$H_2O_2$ at the wavelength of 550 nm was 83% and 75% respectively (FIG. 3a-3b). The optical transmittance value for TW-$H_2O_2$ was similar to that of transparent wood based on delignified wood template (TW-Delign, 86%, prepared according to Example 3). The TW-$H_2O_2$ showed an increase in haze of about 7% compared with TW-Delign.

Tensile Strength

Transparent wood from different wood sources and prepared with a lignin-retaining treatment showed improved wet strength properties compared to transparent wood prepared from delignified wood (Table 1).

3-Point Bending

Figure 4:
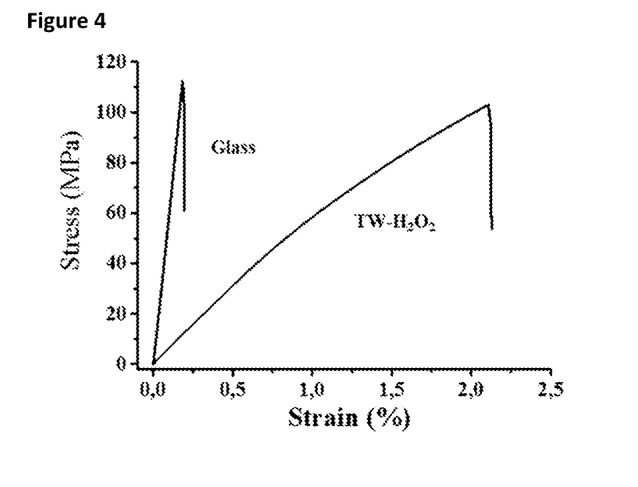
FIG. 4 presents bending stress-strain curves of transparent wood and glass.

In a 3-point bending test the transparent wood (TW-H$_2$O$_2$) prepared according to Example 3 from balsa with dimensions of 50 mm×50 mm and thickness of 1.5 mm showed comparable stress at break (100.7±8.7 MPa) with glass (116.3±12.5 MPa), and a magnitude higher strain to failure (2.18%±0.14) than glass (0.19%±0.02). This leads to a magnitude higher work of fracture for transparent wood (119.5 J/m$^3$) than glass (10.2 J/m$^3$). The stress-strain curves are shown in FIG. 4. A 3-point bending test also showed that bleached transparent wood (TW-H$_2$O$_2$) has a higher modulus of elasticity in bending (6 GPa) than both PMMA (2.5 GPa) and the original wood structure (3.4 GPa). Thus, bleached TW impregnated with PMMA is stronger than both PMMA and original wood.

The invention claimed is:

1. Transparent wood comprising a wood substrate and at least one polymer, wherein said transparent wood has an optical transmittance of at least 60% at a wavelength in the electromagnetic spectrum of wavelengths from 400 to 1000 nm, and wherein the wood substrate comprises more than 15% lignin, measured as Klason lignin.

2. The transparent wood according to claim 1, further having a haze of at least 60% at a wavelength in the electromagnetic spectrum of wavelengths from 400 to 1000 nm.

3. The transparent wood according to claim 1, wherein the optical transmittance is at least 70%.

4. The transparent wood according to claim 1, having a thickness of at least 0.3 mm.

5. The transparent wood according to claim 1, wherein the polymer has a refractive index from 1.3 to 1.7.

6. A method for preparing transparent wood, comprising the steps of
    a) Providing at least one piece of wood substrate;
    b) Adding a bleaching liquor to inactivate chromophores in the wood substrate, thereby obtaining a bleached wood substrate comprising at least 15% lignin;
    c) Impregnating the bleached wood substrate obtained in (b) with a solution comprising pre-polymers, or monomers, or a combination thereof,
    d) Polymerizing the impregnating pre-polymers, or monomers, or combination thereof, to obtain a transparent wood comprising a wood substrate and at least one polymer.

7. The method according to claim 6, wherein the bleaching liquor comprises a peroxide system.

8. The method according to claim 7, wherein the peroxide system comprises hydrogen peroxide.

9. The method according to claim 6, wherein the method further comprises a step of removing metal ions from the piece of wood.

10. The method according to claim 9, wherein removing metal ions from the piece of wood comprises adding DTPA before adding the bleaching liquor.

11. The method according to claim 6, wherein bleaching of the wood in step (b) is performed until the wood substrate has a brightness of at least 70%.

12. The method according to claim 6, wherein the bleaching liquor in step (b) further comprises stabilizers and chelating agents.

13. The method according to claim 6, wherein the method further comprises a step of solvent exchange after having obtained the bleached wood in step (b).

14. The method according to claim 6, wherein the polymer obtained in step (d) has a refractive index of from 1.3 to 1.7.

15. Transparent wood obtained by the method according to claim 6, wherein the wood substrate comprises more than 15% lignin, measured as Klason lignin.

* * * * *